(12) United States Patent
Mitsugi et al.

(10) Patent No.: US 10,981,368 B2
(45) Date of Patent: Apr. 20, 2021

(54) DECORATIVE GLASS PANEL AND MANUFACTURING METHOD THEREFOR

(71) Applicant: NISSHA CO., LTD., Kyoto (JP)

(72) Inventors: Takushi Mitsugi, Kyoto (JP); Hiroyasu Shigeta, Kyoto (JP); Daichi Hama, Kyoto (JP); Chuzo Taniguchi, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 16/626,641

(22) PCT Filed: Apr. 10, 2018

(86) PCT No.: PCT/JP2018/015131
§ 371 (c)(1),
(2) Date: Dec. 26, 2019

(87) PCT Pub. No.: WO2019/003570
PCT Pub. Date: Jan. 3, 2019

(65) Prior Publication Data
US 2020/0156360 A1     May 21, 2020

(30) Foreign Application Priority Data

Jun. 27, 2017   (JP) .............................. JP2017-125418

(51) Int. Cl.
*B32B 37/00*       (2006.01)
*B32B 1/00*        (2006.01)
(Continued)

(52) U.S. Cl.
CPC .............. *B32B 37/025* (2013.01); *B32B 1/00* (2013.01); *B32B 3/30* (2013.01); *B32B 7/12* (2013.01);
(Continued)

(58) Field of Classification Search
CPC ..... B32B 17/06; B32B 1/00; B32B 2255/205; B32B 2315/08; B32B 2451/00;
(Continued)

(56) References Cited

FOREIGN PATENT DOCUMENTS

| JP | 57-105386 A | 6/1982 |
| JP | 57-170843 A | 10/1982 |

(Continued)

OTHER PUBLICATIONS

English translation of claims of JP2007245725.*
(Continued)

*Primary Examiner* — Sonya M Sengupta (57) ABSTRACT

Provided are a decorative glass panel having a three-dimensional metal design and a manufacturing method for the decorative glass panel, the method exhibiting enhanced productivity. A decorative glass panel 10 includes: a glass substrate 15; an adhesive layer 11 formed on the glass substrate 15; a non-uniform pattern layer 12 formed on the adhesive layer 11; and a vapor-deposited metal layer 13 formed on the non-uniform pattern layer 12. In the glass substrate 15, a section that is a portion of a back surface of the glass substrate 15 and that is bent from a flat surface section 30 to an upright section 31 forms a curved surface 32. The non-uniform pattern layer 12 has, in a surface facing the vapor-deposited metal layer 13, which is a top surface thereof, a non-uniform pattern formed by depressions 40 and protrusions 41.

2 Claims, 7 Drawing Sheets

(51) Int. Cl.
*B32B 3/30* (2006.01)
*B32B 7/12* (2006.01)
*B32B 17/06* (2006.01)
*B32B 37/12* (2006.01)
*B44C 3/02* (2006.01)
*B44F 1/04* (2006.01)

(52) U.S. Cl.
CPC .............. *B32B 17/06* (2013.01); *B32B 37/12* (2013.01); *B44C 3/02* (2013.01); *B32B 2255/205* (2013.01); *B32B 2315/08* (2013.01); *B32B 2451/00* (2013.01); *B44F 1/04* (2013.01)

(58) Field of Classification Search
CPC ......... B32B 37/025; B32B 37/12; B32B 3/30; B32B 7/12; C03C 17/38; C03C 17/42; B44C 3/02; B44C 5/0407; B44F 1/04; B44F 1/045
USPC .................................. 156/233, 237, 247, 278
See application file for complete search history.

(56) References Cited

FOREIGN PATENT DOCUMENTS

| | | |
|---|---|---|
| JP | 61-15387 A | 1/1986 |
| JP | 4-254801 A | 9/1992 |
| JP | 6-263487 A | 9/1994 |
| JP | H06263487 A | 9/1994 |
| JP | 7-96698 A | 4/1995 |
| JP | 8-258497 A | 10/1996 |
| JP | 9-255367 A | 9/1997 |
| JP | H1186757 A | 3/1999 |
| JP | 2000-501194 A | 2/2000 |
| JP | 2002117790 A | 4/2002 |
| JP | 2004-358925 A | 12/2004 |
| JP | 2007-99583 A | 4/2007 |
| JP | 2007-245725 A | 9/2007 |
| JP | 2009-279831 A | 12/2009 |
| JP | 2009279831 A | 12/2009 |
| JP | 2013-131129 A | 7/2013 |

OTHER PUBLICATIONS

English translation of claims of JPH09255367.*
English translation of description of JP2007245725.*
English translation of description of JPH09255367.*
Drawings of JP2007245725.*
Drawings of JPH09255367.*
International search report of PCT Patent Application No. PCT/JP2018/015131 dated May 29, 2018.
Written Opinion of PCT Patent Application No. PCT/JP2018/015131 dated May 29, 2018.

* cited by examiner

DECORATIVE GLASS PANEL AND MANUFACTURING METHOD THEREFOR

FIELD OF THE INVENTION

The present disclosure relates to a decorative glass panel and a manufacturing method therefor, and in particular, to a decorative glass panel provided with a vapor-deposited metal layer and a manufacturing method therefor.

BACKGROUND OF THE INVENTION

There exists a glass product decorated with a vapor-deposited metal layer. A method of using a decorative sheet (see patent document 1) and a method of directly performing metal vapor deposition on a glass substrate (see patent document 2) are used as methods for manufacturing such a glass product. In the method of using a decorative sheet, a decorative sheet in which a vapor-deposited metal layer is provided on a base sheet serving as a support is used. In addition, in the case of a three-dimensional metal design, a non-uniform pattern layer is further provided between the base sheet and the vapor-deposited metal layer. A glass product having a three-dimensional metal design is manufactured by bonding the decorative sheet to a glass substrate or by transferring the vapor-deposited metal layer and the non-uniform pattern layer in the decorative sheet from the base sheet to a glass substrate. In the method of directly performing metal vapor deposition on a glass substrate, a glass product having a three-dimensional metal design is manufactured by placing the glass substrate in a vacuum vapor deposition chamber and forming, by a vacuum vapor deposition method, a vapor-deposited metal layer formed of metals, oxides or the like.

PRIOR ART DOCUMENT

Patent Document

Patent document 1: JP Laid-Open No. 2007-245725
Patent document 2: JP Laid-Open No. 9-255367

SUMMARY OF THE INVENTION

Problem to be Solved by the Invention

In conventional glass products and manufacturing methods therefor as described above, in the case where a glass substrate has a curved surface, in the method of using a decorative sheet, a vapor-deposited metal layer does not follow a glass substrate while the decorative sheet is being bonded to the glass substrate, so that cracks may occur. In the method of directly performing metal vapor deposition on a glass substrate, glass strength may be deteriorated due to metals, oxides or the like deposited on the glass substrate.

The present disclosure has been made to solve the above problems, and the object of the present disclosure is to provide a decorative glass panel having a three-dimensional metal design and a manufacturing method for the decorative glass panel, the method exhibiting enhanced productivity.

Technical Means to Solve the Problem

In order to achieve the above object, a first aspect of the present disclosure provides a decorative glass panel including: a glass substrate having a surface with at least a portion thereof being a curved surface; a non-uniform pattern layer formed on the surface of the glass substrate and having a non-uniform pattern on a top surface of the non-uniform pattern layer; and a vapor-deposited metal layer formed on the top surface of the non-uniform pattern layer.

According to the above structure, the vapor-deposited metal layer is formed on the curved surface of the glass substrate via the non-uniform pattern layer, thereby forming the decorative glass panel in which the vapor-deposited metal layer is firmly fixed to the curved surface and which has a three-dimensional metal design.

A second aspect of the present disclosure provides a decorative glass panel. On the basis of the structure according to the first aspect of the present disclosure, the decorative glass panel further includes a base sheet formed between the glass substrate and the non-uniform pattern layer.

According to the above structure, the base sheet can be used for decoration, and the base sheet in combination with the vapor-deposited metal layer enables the decorative glass panel to have a better design character.

A third aspect of the present disclosure provides a decorative glass panel. On the basis of the structure according to the first or second aspect of the present disclosure, the vapor-deposited metal layer is formed by laminating a plurality of layers having different refractive indices.

According to the above structure, light is reflected between layers having different refractive indices, thereby generating interference of light. Thus, the gloss of a rainbow pattern can be felt.

A fourth aspect of the present disclosure provides a decorative glass panel. On the basis of the structure according to the third aspect of the present disclosure, layers neighboring in a laminating direction in the vapor-deposited metal layer have different refractive indices.

According to the above structure, light is reflected between all the layers, thereby generating more interference of light. Thus, the gloss of a rainbow pattern having a better design characteristic can be felt.

A fifth aspect of the present disclosure provides a manufacturing method for a decorative glass panel, the method including: a process of preparing a glass substrate having a surface with at least a portion thereof being a curved surface; a process of forming a decorative sheet by forming, on a base sheet, a non-uniform pattern layer having a non-uniform pattern on a bottom surface thereof; a process of fixing the glass substrate and the decorative sheet in such a manner that the surface of the glass substrate is disposed opposed to the non-uniform pattern layer of the decorative sheet; a process of peeling the base sheet off the decorative sheet and transferring the non-uniform pattern layer onto the glass substrate; and a process of forming a vapor-deposited metal layer on a top surface of the non-uniform pattern layer.

According to the above structure, the vapor-deposited metal layer is formed on the non-uniform pattern layer that is formed on the curved surface of the glass substrate by means of transfer. Thus, a metal design having a predetermined non-uniform pattern can be reliably formed on the curved surface of the glass substrate while preventing metal cracks.

A sixth aspect of the present disclosure provides a manufacturing method for a decorative glass panel, the method including: a process of preparing a glass substrate having a surface with at least a portion thereof being a curved surface; a process of forming a decorative sheet by forming, on a base sheet, a non-uniform pattern layer having a non-uniform pattern on a top surface thereof; a process of fixing the glass substrate and the decorative sheet in such a manner that the surface of the glass substrate is disposed opposed to the base sheet of the decorative sheet; and a process of forming a vapor-deposited metal layer on the top surface of the non-uniform pattern layer.

According to the above structure, the vapor-deposited metal layer is formed on the non-uniform pattern layer that is formed on the curved surface of the glass substrate by means of lamination. Thus, a metal design having a predetermined non-uniform pattern can be reliably formed on the curved surface of the glass substrate while preventing metal cracks.

Effectiveness of the Invention

According to the present disclosure, a decorative glass panel in which a vapor-deposited metal layer is formed on a curved surface can be efficiently obtained.

BRIEF DESCRIPTION OF THE DRAWINGS

FIG. 6(a) is a view corresponding to FIG. 1(c). FIG. 6(b) is a view corresponding FIG. 1(d).

DETAILED DESCRIPTION OF THE EMBODIMENTS

The present disclosure will be explained in detail with reference to the embodiments and the accompanying drawings.

Referring to FIGS. 1(a) to 1(d), a decorative glass panel 10 according to a first embodiment of the present disclosure has a shape of a rectangular in a plan view, the rectangular having four R-shaped angles. The decorative glass panel 10 includes a flat surface section and an upright section, the flat surface section having a flat plate shape, and the upright section being bent from a periphery of the flat surface section to form an R-shape over the entire circumference thereof and extending, at a same height, toward a bottom surface side of the flat surface section.

The decorative glass panel 10 includes a glass substrate 15, an adhesive layer 11 formed on the glass substrate 15, a non-uniform pattern layer 12 formed on the adhesive layer 11, and a vapor-deposited metal layer 13 formed on the non-uniform pattern layer 12. In the glass substrate 15, a section that is a portion of a back surface of the glass substrate 15 and that is bent from a flat surface section 30 to an upright section 31 forms a curved surface 32. The non-uniform pattern layer 12 has, in a surface facing the vapor-deposited metal layer 13, which is a top surface thereof, a non-uniform pattern formed by depressions 40 and protrusions 41. The decorative glass panel 10 is employed, for example, in a housing of a portable terminal.

As the glass substrate 15, for example, tempered glass, sapphire glass, zirconia glass, soda glass, or borosilicate glass may be used. Furthermore, the thickness of the glass substrate 15 is preferably in a range from 100 μm to 1000 μm. When the thickness is more than 100 μm, the glass substrate 15 has sufficient strength, and when the thickness is less than 1000 μm, the weight of the glass substrate 15 makes it easy to transport the decorative glass panel 10.

The non-uniform pattern layer 12 is a layer that presents a three-dimensional design. As a material, for example, a polyester resin, a polyurethane resin, an epoxy resin, an acrylic/ethylene resin, an acrylic resin, an ethylene resin, or a melamine resin, may be used. The entire thickness of the non-uniform pattern layer 12 is preferably in a range from 1 μm to 50 μm. When the non-uniform pattern layer 12 has a thickness of more than 1 μm, such a thickness is enough for the formation of the non-uniform pattern. Furthermore, when the non-uniform pattern layer 12 has a thickness of less than 50 μm, the vapor-deposited metal layer 13 formed on the non-uniform pattern layer 12 can be easily, visually recognized from a front surface side of the glass substrate 15. In addition, the height of the non-uniform pattern indicated by a height from the lowermost portion of the depressions 40 to the uppermost portion of the protrusions 41 is selected from a range from 0.1 μm to 20 μm and is not greater than the thickness of the non-uniform pattern layer 12. When the non-uniform pattern has a height of more than 0.1 μm, a metal design of the decorative glass panel 10 can be three-dimensionally presented by the combination of the non-uniform pattern with the vapor-deposited metal layer 13. Furthermore, when the non-uniform pattern has a height of less than 20 μm, generation of vapor deposition defects, such as cracks, can be suppressed. In addition, the non-uniform pattern layer 12 may be formed on the glass substrate 15 by, for example, a transfer method using a decorative sheet 50.

Figure 2:
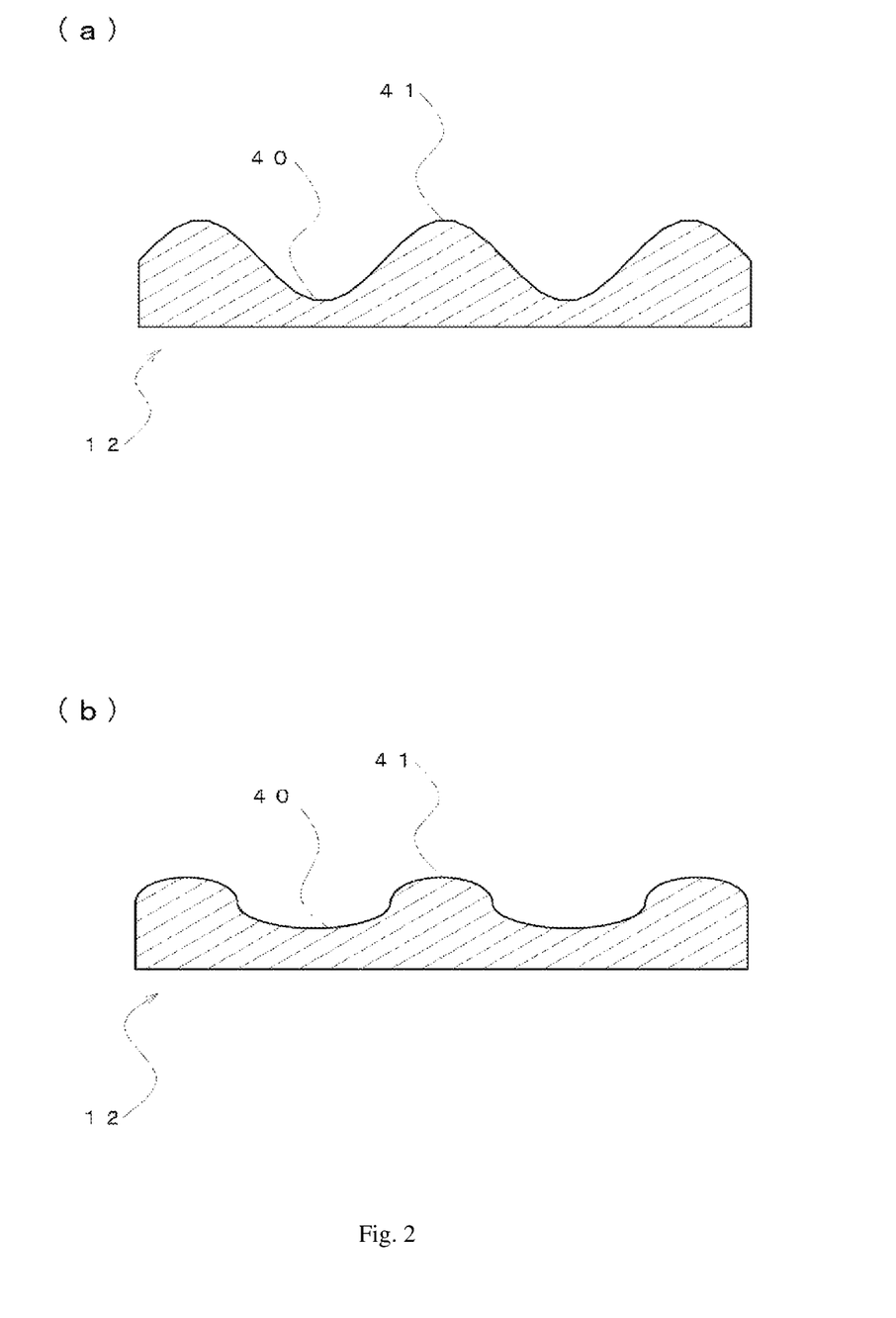
FIGS. 2(a) and 2(b) are cross-sectional views showing examples of a non-uniform pattern layer of a decorative sheet used in various embodiments of the present disclosure.
Figure 3:
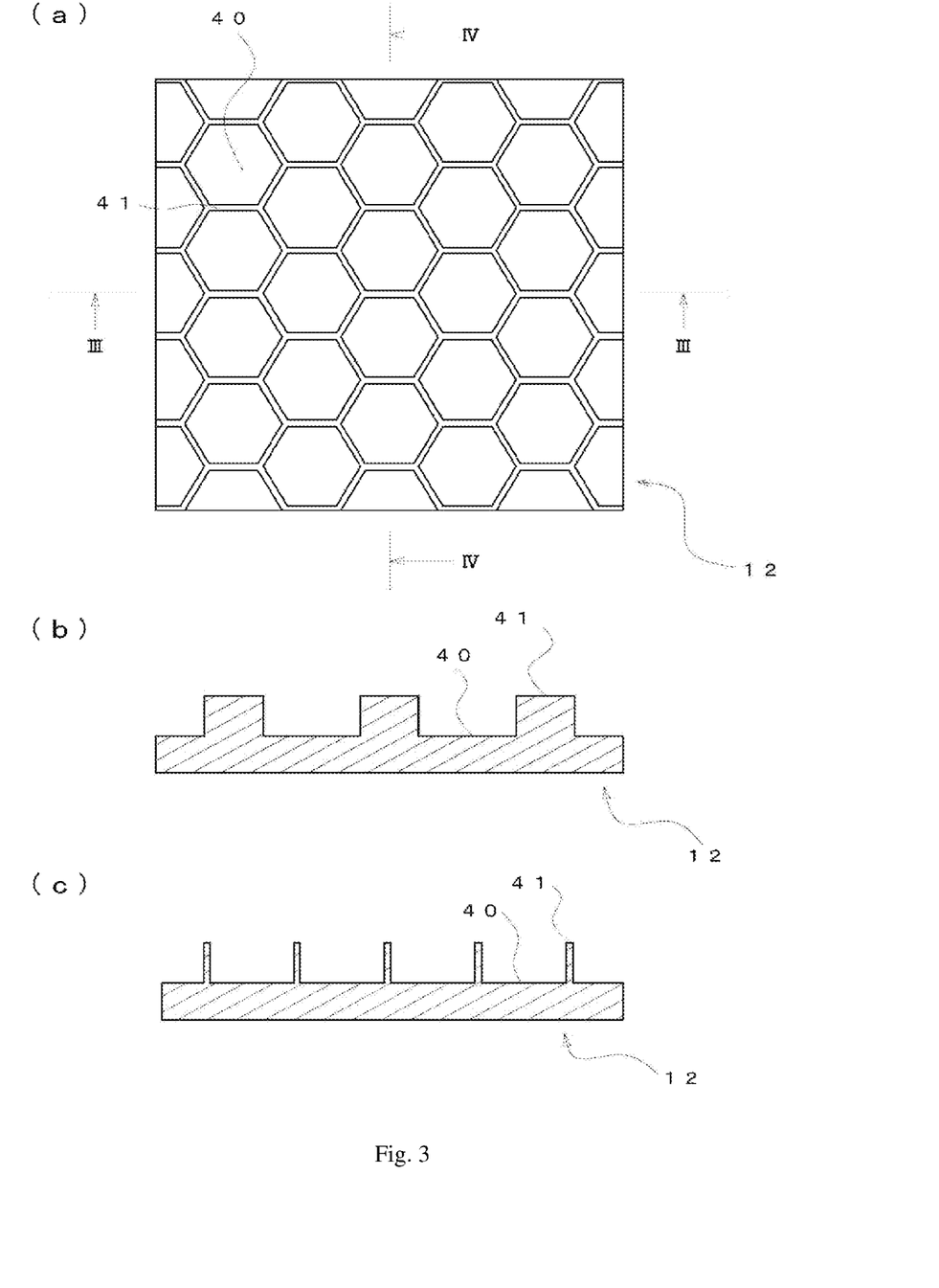
FIG. 3(a) is a plan view showing an example of a non-uniform pattern layer of a decorative sheet used in various embodiments of the present disclosure.
FIG. 3(b) is a cross-sectional view taken along line III-III shown in FIG. 3(a).
FIG. 3(c) is a cross-sectional view taken along line IV-IV shown in FIG. 3(a).
Figure 4:
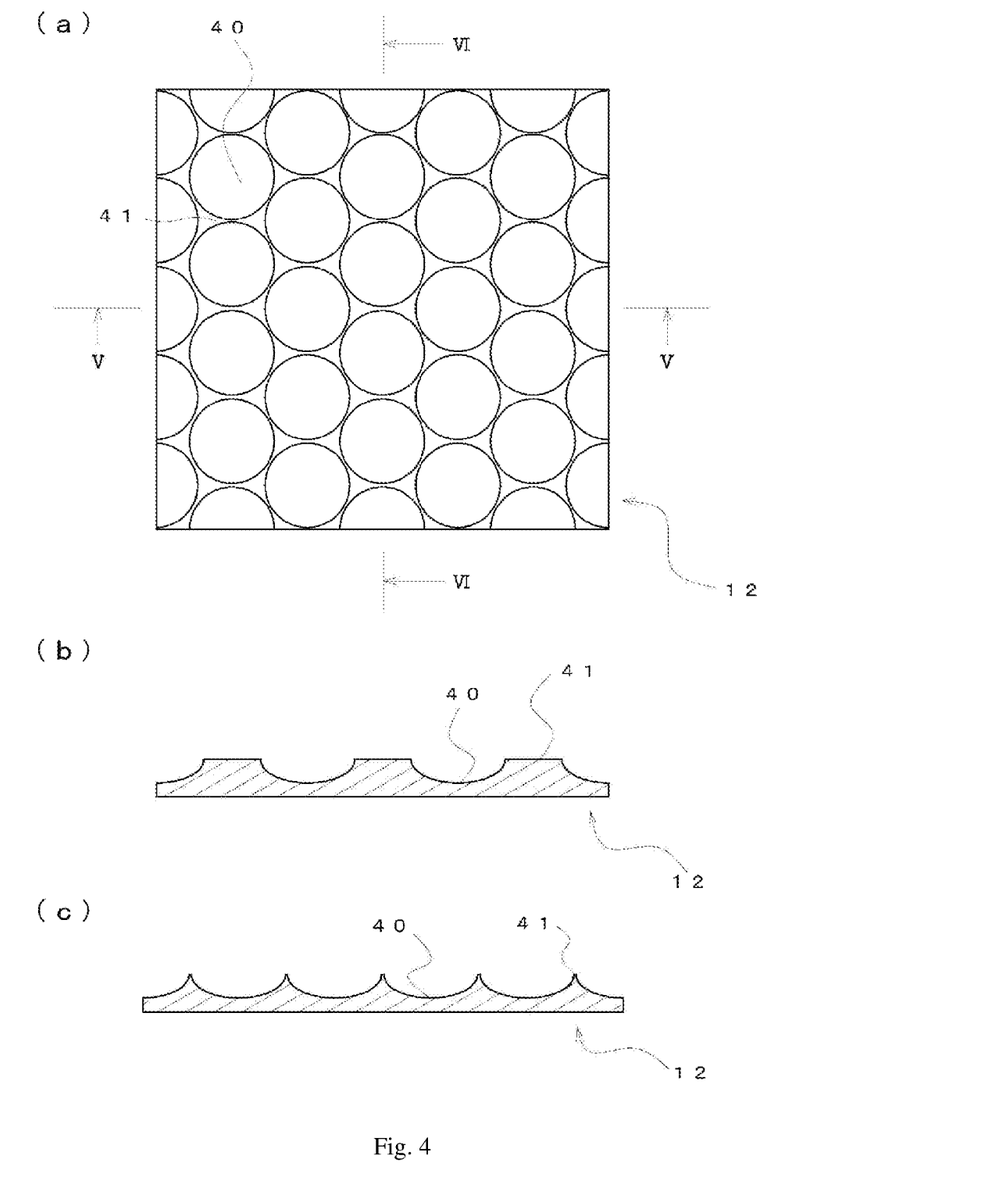
FIG. 4(a) is a plan view showing an example of a non-uniform pattern layer of a decorative sheet used in various embodiments of the present disclosure.
FIG. 4(b) is a cross-sectional view taken along line V-V shown in FIG. 4(a).
FIG. 4(c) is a cross-sectional view taken along line VI-VI shown in FIG. 4(a).

Examples of the shape of the non-uniform pattern formed on the non-uniform pattern layer 12 are shown with reference to FIGS. 2 to 4. The non-uniform pattern may be, for example, a plurality of linear non-uniform patterns, or a non-uniform pattern that is formed by depressions 40 or protrusions 41 arranged on a plane and having a polygonal shape, a circular shape or an elliptical shape in a plan view. Referring to FIG. 2, a linear non-uniform pattern may be a non-uniform pattern that is formed by a plurality of linear depressions 40 and protrusions 41 periodically arranged in parallel with each other and that has a wave shape in cross section. For example, referring to FIG. 2(a), the linear non-uniform pattern may be a non-uniform pattern in which depressions 40 and protrusions 41 have a same height and a same width. Referring to FIG. 2(*b*), the linear non-uniform pattern may be a non-uniform pattern in which depressions 40 and protrusions 41 have different heights and different widths. Furthermore, referring to FIG. 3, depressions 40 having a regular hexagonal shape in a plan view may be arranged in a honeycomb structure. Referring to FIG. 4, depressions 40 having a circular shape in a plan view may be arranged in a matrix-lattice pattern without a gap. The shape in a plan view of depressions 40 or protrusions 41 is not limited to a regular hexagonal shape and a circular shape, and may be a polygonal shape such as a triangular shape and a quadrangular shape or may be an elliptical shape. In this case, the non-uniform pattern formed by depressions 40 or protrusions 41 having a polygonal shape, a circular shape or an elliptical shape in a plan view may be a non-uniform pattern formed by depressions 40 or protrusions 41 which are closely and periodically arranged in a plane.

The vapor-deposited metal layer 13 is a layer that presents a metal design. As a material, for example, a metal such as aluminum and tin, or an oxide such as silicon dioxide, titanium oxide and zirconium dioxide, may be used. These materials may be used singly to form the vapor-deposited metal layer, or more than two of them may be used to form a plurality of laminated layers so as to form the vapor-deposited metal layer. In the case where a plurality of layers are formed by laminating two or more of the materials, a plurality of layers having different refractive indices are preferably laminated. Further, lamination is more preferably performed in such a manner that layers neighboring in a laminating direction have different refractive indices. That is, in the case where layers having a refractive index of A and layers having a refractive index of B are used, lamination may be performed in such a manner as AB, BA, and ABA. In addition, in the case where two layers having a refractive index of A and two layers having a refractive index of B are used, lamination is more preferably performed in such a manner that layers neighboring in a laminating direction have different refractive indices, for example, in such a manner as ABAB. In the case where lamination is performed in an order of ABAB, light is refracted and reflected between all layers, i.e., between A and B, between B and A, and between A and B, so that interference of light is generated by more light. Therefore, when observing the vapor-deposited metal layer 13, one can feel the gloss of a rainbow pattern having a better design characteristic. Furthermore, in the case where layers having a refractive index C are used in addition to layers having a refractive index of A and layers having a refractive index of B, the layers may be sequentially laminated in such a manner as ABCABC, or may be non-sequentially laminated in such a manner as ABCBA. As a practical example, titanium oxide and silicon dioxide having different refractive indices are used as the vapor-deposited metal layer 13, and five layers are laminated in an order of titanium oxide, silicon dioxide, titanium oxide, silicon dioxide, and titanium oxide. According to this structure, due to different refractive indices between neighboring layers, light is reflected between all the layers, and interference of light is generated between the reflected light. Therefore, when observing the vapor-deposited metal layer 13, one can feel the gloss of a rainbow pattern, and a design characteristic is improved.

In addition, the design characteristic can be changed by changing thicknesses of more than one of a plurality of layers. For example, in the cases where the layer closest to the non-uniform pattern layer 12 has thicknesses of d1 nm and d2 nm respectively, even if observed from the same angle of view, the same portion of the vapor-deposited metal layer 13 has different colors in the case of d1 nm and in the case of d2 nm. Thus, the design characteristic can be changed.

The entire thickness of the vapor-deposited metal layer 13 is preferably in a range from 10 nm to 2 µm. When the thickness is more than 10 nm, as a metal design, sufficient metallic gloss can be obtained. Furthermore, when the thickness is less than 2 µm, generation of vapor deposition defects, such as cracks, can be suppressed. The vapor-deposited metal layer 13 may be formed on the non-uniform pattern layer 12 by a method, for example, a vacuum vapor deposition method, a sputtering method, or an ion plating method.

The adhesive layer 11 is a layer that has a function of improving the adhesion between the glass substrate 15 and the non-uniform pattern layer 12. As a material, any material, which can be adhered to the glass substrate 15, for example, a polyester resin, an epoxy resin, a vinyl chloride resin, an acrylic resin, a fluorine resin, or a polyurethane resin may be used. In particular, in the case where the adhesive layer 11 is a polyester resin, the glass substrate 15 and the non-uniform pattern layer 12 can be firmly bonded. Furthermore, the thickness of the adhesive layer 11 is preferably in a range from 0.1 µm to 5 µm. When the adhesive layer 11 has a thickness of more than 0.1 µm, the adhesive layer 11 has sufficient adhesion for bonding the glass substrate 15 and the non-uniform pattern layer 12. In addition, when the adhesive layer 11 has a thickness of less than 5 µm, the glass substrate 15 and the non-uniform pattern layer 12 can be bonded while maintaining a satisfactory visibility from the front surface side of the glass substrate 15. Besides, the adhesive layer 11 can be formed on the glass substrate 15 by a transfer method using the decorative sheet 50.

Figure 5:
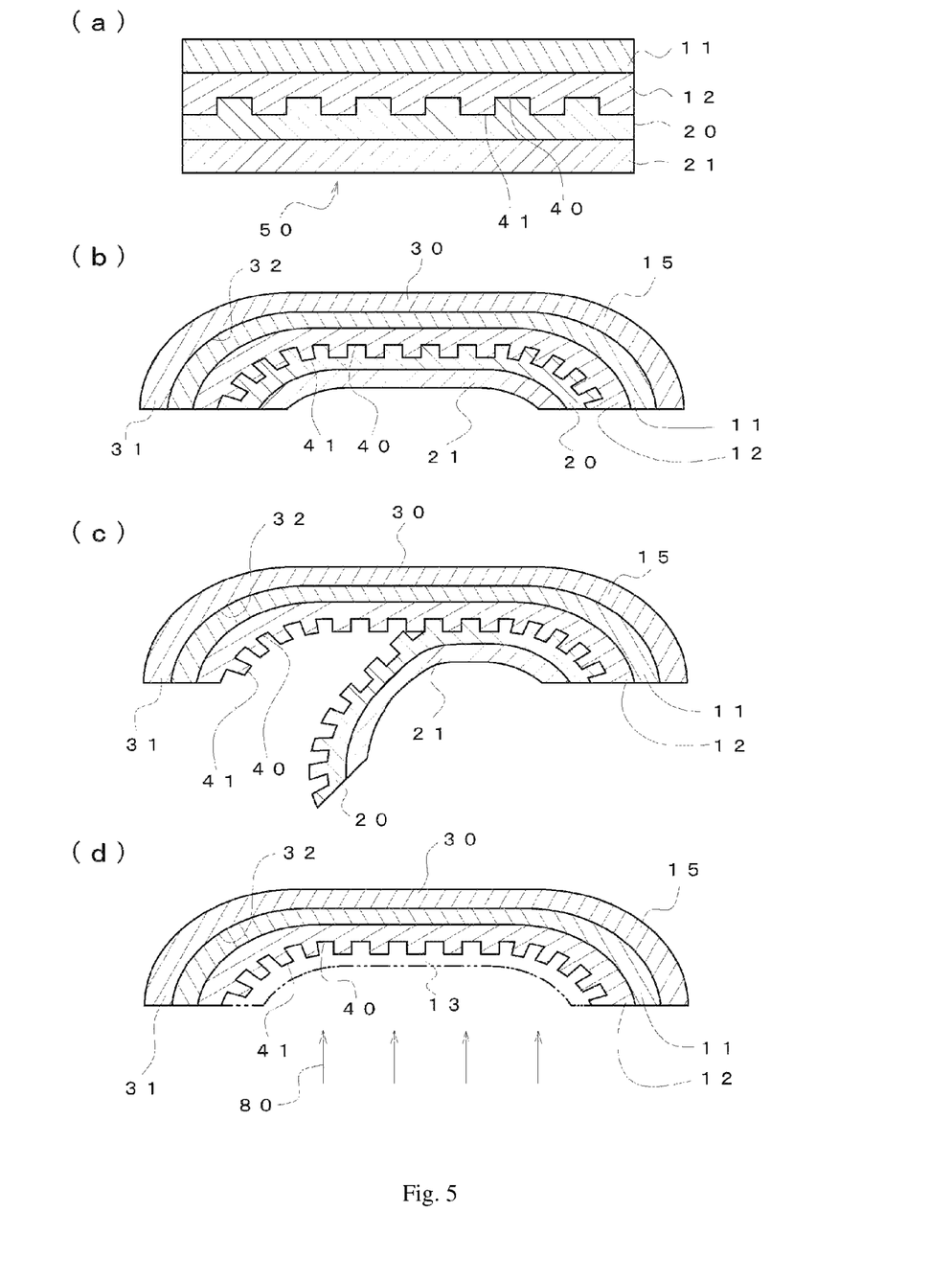
FIG. 5(a) is a cross-sectional view of a decorative sheet used in manufacturing the decorative glass panel shown in FIG. 1.
FIGS. 5(b) to 5(d) are views schematically showing manufacturing processes of the decorative glass panel shown in FIG. 1.

Referring to FIG. 5(*a*), the decorative sheet 50 used in the first embodiment of the present disclosure includes a release layer 20 formed on a base sheet 21, a non-uniform pattern layer 12 formed on the release layer 20, and an adhesive layer 11 formed on the non-uniform pattern layer 12. The non-uniform pattern layer 12 has, in a surfacing facing the release layer 20, which is a bottom surface thereof, a non-uniform pattern.

As a material of the base sheet 21, for example, a resin sheet formed of polyethylene terephthalate (PET), acrylic, polycarbonate, polypropylene (PP) or olefin, or a cellulose sheet formed of glassine paper, coated paper or cellophane, is used. Furthermore, the thickness of the base sheet 21 is preferably in a range from 12 µm to 100 µm. When having a thickness of more than 12 µm, the base sheet 21 has an excellent handleability. When having a thickness of less than 100 µm, the base sheet 21 has an appropriate rigidity and thus has a good handleability.

The release layer 20 is a layer for improving a release property in peeling off the non-uniform pattern layer 12 from the base sheet 21 when the adhesive layer 11 and the non-uniform pattern layer 12 are transferred onto the glass substrate 15 using the decorative sheet 50, and the release layer 20 remains on the base sheet 21 after transfer. As a material, for example, a melamine resin, a silicon resin, a fluorine resin, an epoxy resin, a urea resin, a urethane resin, a polyester resin, or a phenol resin is used. In addition, the thickness of the release layer 20 is preferably in a range from 0.1 µm to 20 µm. When the release layer 20 has a thickness of more than 0.1 µm, it can be easily coated onto the base sheet. Furthermore, when the release layer 20 has a thickness of less than 20 µm, the occurrence of cracks in the release layer 20 can be suppressed while the decorative sheet 50 is being bonded to the glass substrate 15. The release layer 20 may be formed on the base sheet 21 by a conventional method. Examples of conventional layer formation methods include coating methods such as gravure coating, roll coating and comma coating, and further include printing methods such as gravure printing and screen printing.

Similarly to the formation of the release layer 20, the non-uniform pattern layer 12 is formed on the release layer 20 by a conventional layer formation method.

Similarly to the formation of the release layer 20, the adhesive layer 11 is formed on the non-uniform pattern layer 12 by a conventional layer formation method.

Next, a manufacturing method for the decorative glass panel 10 manufactured using the decorative sheet 50 shown in FIG. 5(a) will be described.

Figure 1:
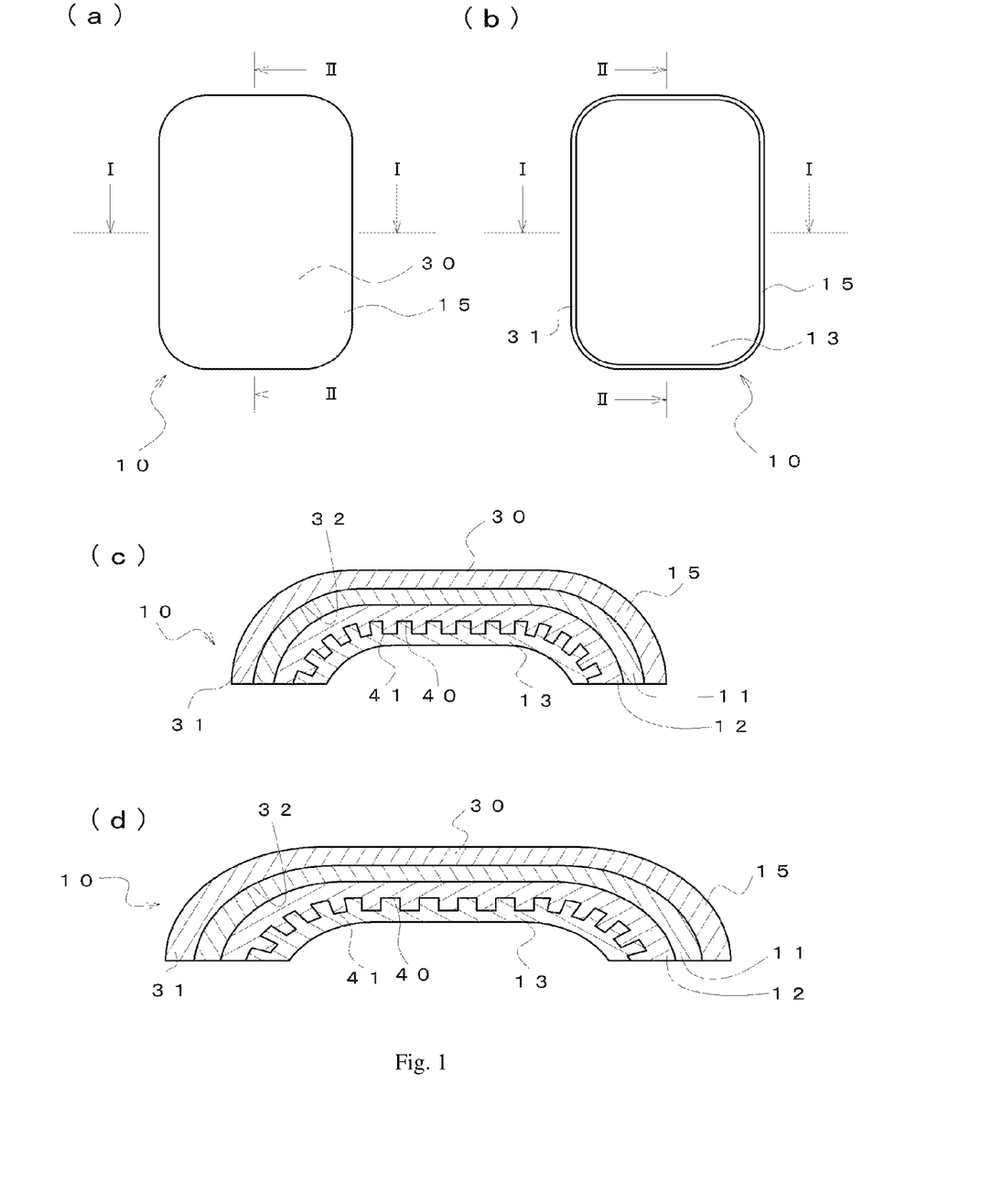
FIG. 1(a) is a plan view of a decorative glass panel according to a first embodiment of the present disclosure.
FIG. 1(b) is a bottom view of the decorative glass panel shown in FIG. 1(a).
FIG. 1(c) is a cross-sectional view taken along line I-I shown in FIGS. 1(a) and 1(b).
FIG. 1(d) is a cross-sectional view taken along line II-II shown in FIGS. 1(a) and 1(b).

First, cutting, polishing, press forming and the like are performed on a glass plate so as to prepare the glass substrate 15 having a flat surface section at a center thereof and having an upright section that is bent and extends upright from a periphery of the flat surface section to a bottom surface side thereof over an entire circumference thereof. The bent portion forms a curved surface. Next, the decorative sheet 50 is prepared. First, as the release layer 20, a melamine resin is applied, with a thickness of 0.5 µm, onto the base sheet 21 by a coating method. Next, in order to form the non-uniform pattern layer 12 having a non-uniform pattern, a non-uniform pattern opposite to the non-uniform pattern layer 12 is formed on the release layer 20. Here, the non-uniform pattern opposite to the non-uniform patter layer 12 means that depressions 40 and protrusions 41 of the non-uniform pattern layer 12 respectively correspond to protrusions and depressions of said non-uniform pattern. First, a mold having the same non-uniform pattern as the non-uniform pattern layer 12 is laminated on the release layer 20 in such a manner that a surface, which is provided with the non-uniform pattern, of the mold faces the release layer 20. Next, by pressing the mold from a side thereof facing away from the release layer 20, the non-uniform pattern opposite to the non-uniform pattern layer 12 is formed on the release layer 20. Next, as the non-uniform pattern layer 12, a polyester resin is applied, by a coating method and with a thickness of 15 µm, onto the release layer 20 having the non-uniform pattern. The polyester resin is laminated on the non-uniform pattern of the release layer 20, so that a non-uniform pattern is formed in a surface which is a bottom surface of the non-uniform pattern layer 12 and which faces the release layer 20. Next, as the adhesive layer 11, a polyester resin is applied, with a thickness of 0.3 µm, onto the non-uniform pattern layer 12, so that the decorative sheet 50 is formed. Next, the non-uniform pattern layer 12 is transferred onto the glass substrate 15 using the decorative sheet 50. Referring to FIG. 5(b), a surface of the decorative sheet 50 on an adhesive layer 11 side is laminated on a back surface of the glass substrate 15 in such a manner that the back surface of the glass substrate 15 is disposed opposed to the non-uniform pattern layer 12 of the decorative sheet 50. Next, a heat-resistant rubber-like elastomer, such as silicon rubber, is used. Heat and pressure are applied to a base sheet 21 side of the decorative sheet 50 by means of a heat-resistant rubber-like elastomer with a temperature of about 80° C. to 260° C. and a pressure of about 50 Pa to 2000 Pa, so that the decorative sheet 50 is bonded to the glass substrate 15. Next, the bonded decorative sheet 50 is cooled to room temperature. Next, referring to FIG. 5(c), by peeling off the release layer 20 from the non-uniform pattern layer 12, the non-uniform pattern layer 12 is transferred onto the glass substrate 15. Next, the vapor-deposited metal layer 13 is formed on the non-uniform pattern layer 12. Referring to FIG. 5(d), a layer of titanium oxide having a film thickness of 40 nm, a layer of silicon dioxide having a film thickness of 170 nm, a layer of titanium oxide having a film thickness of 40 nm, a layer of silicon dioxide having a film thickness of 170 nm, and a layer of titanium oxide having a film thickness of 40 nm are sequentially deposited 80 on the non-uniform pattern layer 12 by a vacuum vapor deposition method. Thus, the vapor-deposited metal layer 13 is formed, and the decorative glass panel 10 shown in FIG. 1 is manufactured.

From the above, in the decorative glass panel 10 manufactured as described above, the vapor-deposited metal layer 13 is formed via the non-uniform pattern layer 12 which is formed on the curved surface 32 of the glass substrate 15 by means of transfer, so that the decorative glass panel 10 has a three-dimensional metal design in which the vapor-deposited metal layer 13 is firmly fixed to the curved surface 32 of the glass substrate 15 while preventing metal cracks.

Next, with reference to the drawings, a second embodiment of the present disclosure will be described focusing on differences from the foregoing embodiment.

A decorative glass panel 10 according to the second embodiment of the present disclosure has the same shape in a plan view as the decorative glass panel 10 of the first embodiment shown in FIGS. 1(a) and 1(b). Furthermore, referring to FIGS. 6(a) and 6(b), an adhesive layer 11 and a non-uniform pattern layer 12 are formed on a glass substrate 15 which has a curved surface on a portion of a back surface thereof. A vapor-deposited metal layer 13 is formed via the non-uniform pattern layer 12, and this is similar to the first embodiment. In addition, the differences lie in that the glass substrate 15 does not have a flat surface section and in that a base sheet 21 is included between the adhesive layer 11 and the non-uniform pattern layer 12. Front and back surfaces of the glass substrate 15, as a whole, form a shape of a gently curved surface 32 that has the highest section at a central portion thereof and that bulges toward a front surface side.

Figure 6:
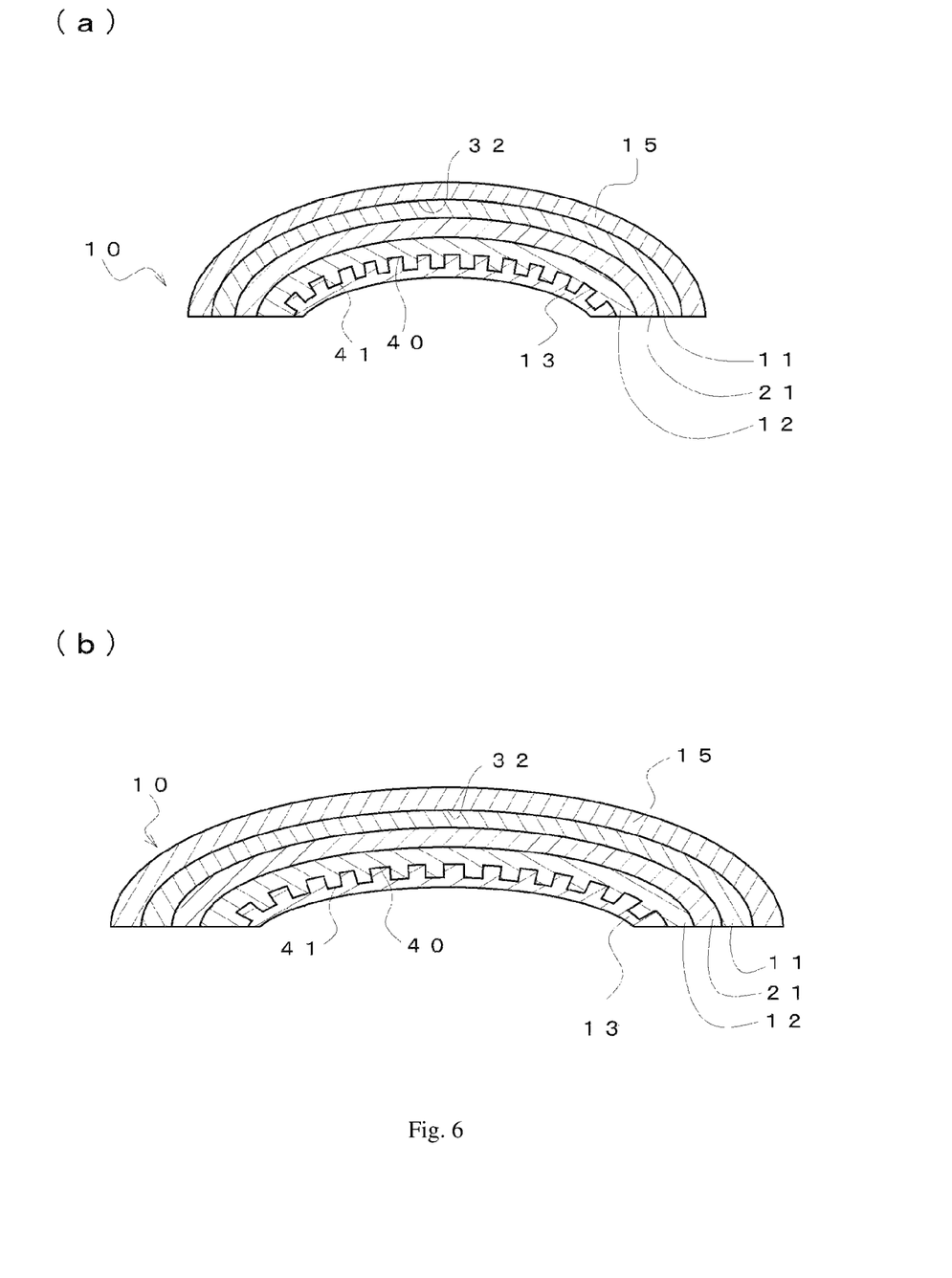
FIG. 6 is a cross-sectional view of a decorative glass panel according to a second embodiment of the present disclosure.

As the glass substrate 15, the same materials as those in the first embodiment of the present disclosure may be used.

The non-uniform pattern layer 12 is a layer that presents a three-dimensional design. As a material, the same materials as those in the first embodiment of the present disclosure may be used. Furthermore, the non-uniform pattern layer 12 may be formed on the glass substrate 15 by, for example, a lamination method using the decorative sheet 50.

The vapor-deposited metal layer 13 is a layer that presents a metal design. As a material, the same materials as those in the first embodiment of the present disclosure may be used. The vapor-deposited metal layer 13 may be formed on the non-uniform pattern layer 12 by a method, for example, a vacuum vapor deposition method, a sputtering method, or an ion plating method.

The base sheet 21 is a layer that decorates the glass substrate 15. As a material, the same materials as those in the first embodiment of the present disclosure may be used. When it is desired to color the decorative glass panel 10, the base sheet 21 having a predetermined color may be used. Furthermore, the base sheet 21 may be formed on the glass substrate 15 by, for example, a lamination method using the decorative sheet 50.

The adhesive layer 11 is a layer that has a function of improving the adhesion between the glass substrate 15 and the base sheet 21. As a material, the same materials as those in the first embodiment of the present disclosure may be used. Furthermore, the adhesive layer 11 may be formed on the glass substrate 15 by a lamination method using the decorative sheet 50.

Figure 7:
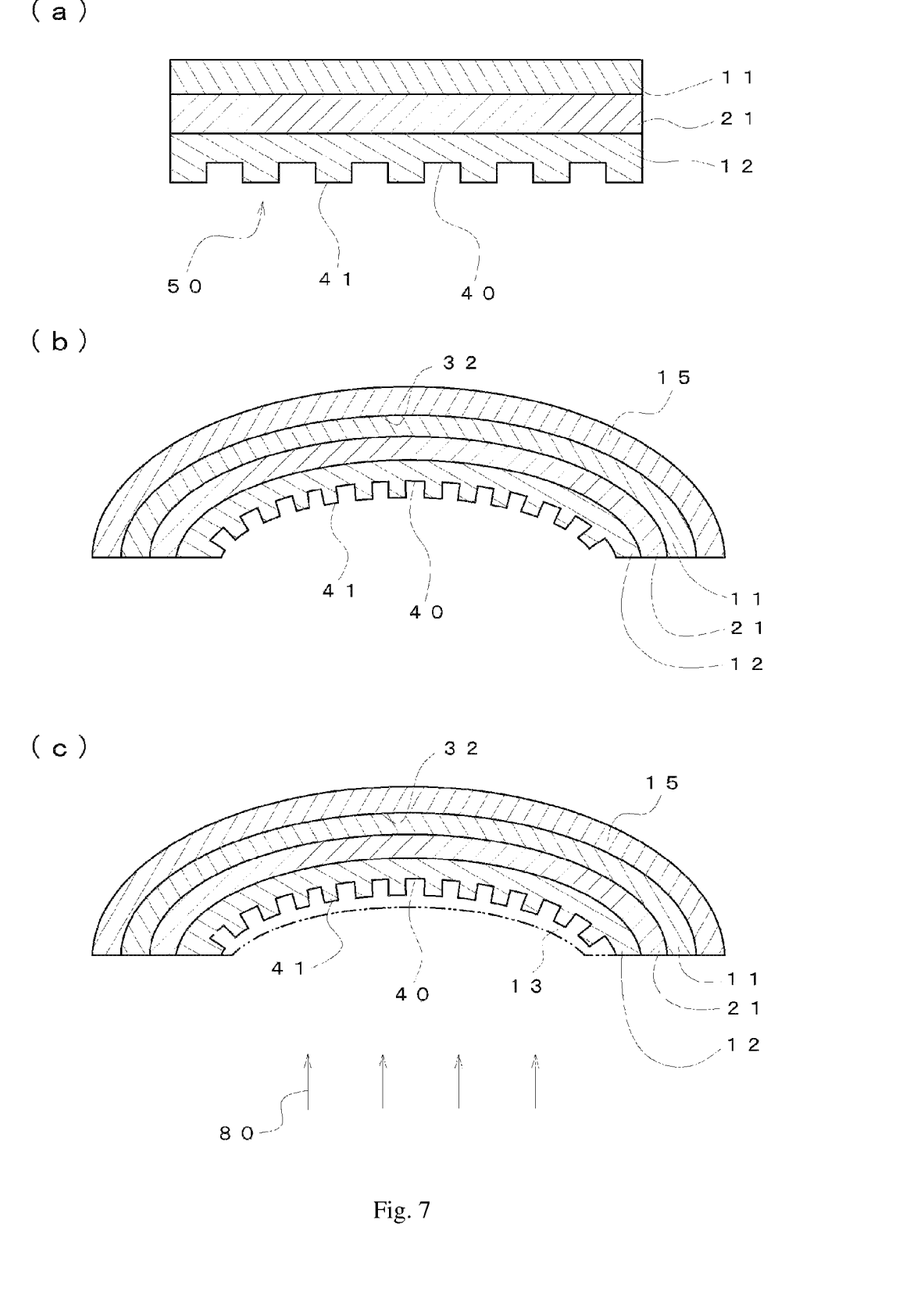
FIG. 7(a) is a cross-sectional view of a decorative sheet used in manufacturing the decorative glass panel shown in FIG. 6.
FIGS. 7(b) and 7(c) are views schematically showing manufacturing processes of the decorative glass panel shown in FIG. 6.

Referring to FIG. 7(*a*), in the decorative sheet 50 used in the second embodiment of the present disclosure, the non-uniform pattern layer 12 is formed on one surface of the base sheet 21, and the adhesive layer 11 is formed on the other surface of the base sheet 21. Furthermore, the non-uniform pattern layer 12 has a non-uniform pattern on a surface thereof facing away from the base sheet 21.

The non-uniform pattern layer 12 and the adhesive layer 11 are formed on the base sheet 21 by a conventional layer formation method.

Next, a manufacturing method for the decorative glass panel 10 manufactured using the decorative sheet 50 shown in FIG. 7(*a*) will be described.

First, cutting, polishing, press molding and the like are performed on a glass plate, so as to prepare the glass substrate 15 of which front and back surfaces, as a whole, form a shape of a gently curved surface that has the highest section at a central portion thereof and that bulges toward a front surface side. Next, the decorative sheet 50 is prepared. First, as the non-uniform pattern layer 12, a polyester resin is applied, with a thickness of 15 µm, onto the base sheet 21 by a coating method. Next, a mold having a non-uniform pattern opposite to the non-uniform pattern layer 12 is laminated in such a manner that a surface, which is provided with the non-uniform pattern, of the mold faces the non-uniform pattern layer 12. Next, by pressing the mold from a side thereof facing away from the non-uniform pattern layer 12, a non-uniform pattern is formed in a surface, which faces away from the base sheet 21, of the non-uniform pattern layer 12. Next, on the other surface of the base sheet 21 where the non-uniform pattern layer 12 is not formed, a polyester resin is applied as the adhesive layer 11 with a thickness of 0.3 µm by a coating method. Thus, the decorative sheet 50 is formed. Next, the decorative sheet 50 is laminated on the glass substrate 15, so that the non-uniform pattern layer 12 is formed on the glass substrate 15. With reference to FIG. 7(*b*), a surface of the decorative sheet 50 on an adhesive layer 11 side is laminated on a back surface of the glass substrate 15 in such a manner that the back surface of the glass substrate 15 is disposed opposed to the base sheet 21 of the decorative sheet 50. Next, a heat-resistant rubber-like elastomer, such as silicon rubber, is used. Heat and pressure are applied to a base sheet 21 side of the decorative sheet 50 by means of a heat-resistant rubber-like elastomer with a temperature of about 80° C. to 260° C. and a pressure of about 50 Pa to 2000 Pa, so that the decorative sheet 50 is bonded to the glass substrate 15. Next, the vapor-deposited metal layer 13 is formed. Referring to FIG. 7(*c*), a layer of titanium oxide having a film thickness of 40 nm, a layer of silicon dioxide having a film thickness of 170 nm, a layer of titanium oxide having a film thickness of 40 nm, a layer of silicon dioxide having a film thickness of 170 nm, and a layer of titanium oxide having a film thickness of 40 nm are sequentially deposited 80 on the non-uniform pattern layer 12 by a vacuum vapor deposition method. Thus, the vapor-deposited metal layer 13 is formed, and the decorative glass panel 10 shown in FIG. 3 is manufactured.

From the above, in the decorative glass panel 10 manufactured as described above, the vapor-deposited metal layer 13 is formed via the non-uniform pattern layer 12 which is formed on the curved surface 32 of the glass substrate 15 by means of lamination, so that the decorative glass panel 10 has a three-dimensional metal design in which the vapor-deposited metal layer 13 is firmly fixed to the curved surface 32 of the glass substrate 15 while preventing metal cracks.

Furthermore, in the above embodiments of the present disclosure, the decorative sheet 50 is provided with the adhesive layer 11. However, in the case where the glass substrate 15 is firmly bonded to the non-uniform pattern layer 12 or to the base sheet 21, the non-uniform pattern layer 12 or the base sheet 21 may be directly provided on the glass substrate 15 without providing the adhesive layer 11.

In addition, in the above embodiments of the present disclosure, the non-uniform pattern layer 12 is formed on an entire surface of the base sheet 21. However, the non-uniform pattern layer 12 does not need to be formed on the entire surface of the base sheet 21, as long as the non-uniform pattern layer 12 is formed at a position of the base sheet 21 corresponding to a portion of the glass substrate 15 where the vapor-deposited metal layer 13 is formed.

Further, in the above embodiments of the present disclosure, in order to form a non-uniform pattern on the non-uniform pattern layer 12, the mold having a non-uniform pattern is used. However, methods, such as chemical etching and sandblasting, may be used, as long as a non-uniform pattern can be formed.

Further, in the above embodiments of the present disclosure, titanium oxide and silicon dioxide in a five-layer structure are used to form the vapor-deposited metal layer 13. However, the vapor-deposited metal layer 13 may be composed of a plurality of layers or a single layer rather than a five-layer structure, as long as a vapor deposition design is formed on the glass substrate 15.

Further, in the first embodiment of the present disclosure, the release sheet 20 is provided in the decorative sheet 50. However, in the case where the base sheet 21 is easily peeled off from the non-uniform pattern layer 12, the non-uniform pattern layer 12 may be directly provided on the base sheet 21 without providing the release layer 20.

Further, in the first embodiment of the present disclosure, a portion of the glass substrate 15 forms the curved surface 32. However, the entire back surface of the glass substrate 15 may be a curved surface. In addition, the front surface of the glass substrate 15 may be a flat surface or a curved surface.

Further, in the second embodiment of the present disclosure, the front and back surfaces of the glass substrate 15, as a whole, form the gently curved surface 32 that has the highest section at a central portion thereof and that bulges toward a front surface side. However, merely a portion of the back surface of the glass substrate 15 may be a curved surface. In addition, the front surface of the glass substrate 15 may be a flat surface or a curved surface.

DESCRIPTION OF THE REFERENCE NUMERALS

10 Decorative glass panel
11 Adhesive layer
12 Non-uniform pattern layer
13 Vapor-deposited metal layer
15 Glass substrate
21 Base sheet
50 Decorative sheet

The invention claimed is:
1. A manufacturing method for a decorative glass panel, the method comprising:
 a process of preparing a glass substrate having a surface with at least a portion of the surface being a curved surface;

a process of forming a decorative sheet by forming, on a base sheet, a non-uniform pattern layer having a non-uniform pattern on a bottom surface of the non-uniform pattern layer;

a process of fixing the glass substrate and the decorative sheet in such a manner that the surface of the glass substrate is disposed opposed to the non-uniform pattern layer of the decorative sheet;

a process of peeling the base sheet off the decorative sheet and transferring the non-uniform pattern layer onto the glass substrate; and a process of forming a vapor-deposited metal layer on a top surface of the non-uniform pattern layer.

2. A manufacturing method for a decorative glass panel, comprising:

a process of preparing a glass substrate having a surface with at least a portion of the surface being a curved surface;

a process of forming a decorative sheet by forming, on a base sheet, a non-uniform pattern layer having a non-uniform pattern on a top surface of the non-uniform pattern layer;

a process of fixing the glass substrate and the decorative sheet in such a manner that the surface of the glass substrate is disposed opposed to the base sheet of the decorative sheet; and a process of forming a vapor-deposited metal layer on the top surface of the non-uniform pattern layer.

* * * * *